Feb. 9, 1960   G. H. PACKWOOD, JR., ET AL   2,924,358
GRANULAR SOAP DISPENSING APPARATUS
Filed Jan. 4, 1954   4 Sheets-Sheet 1
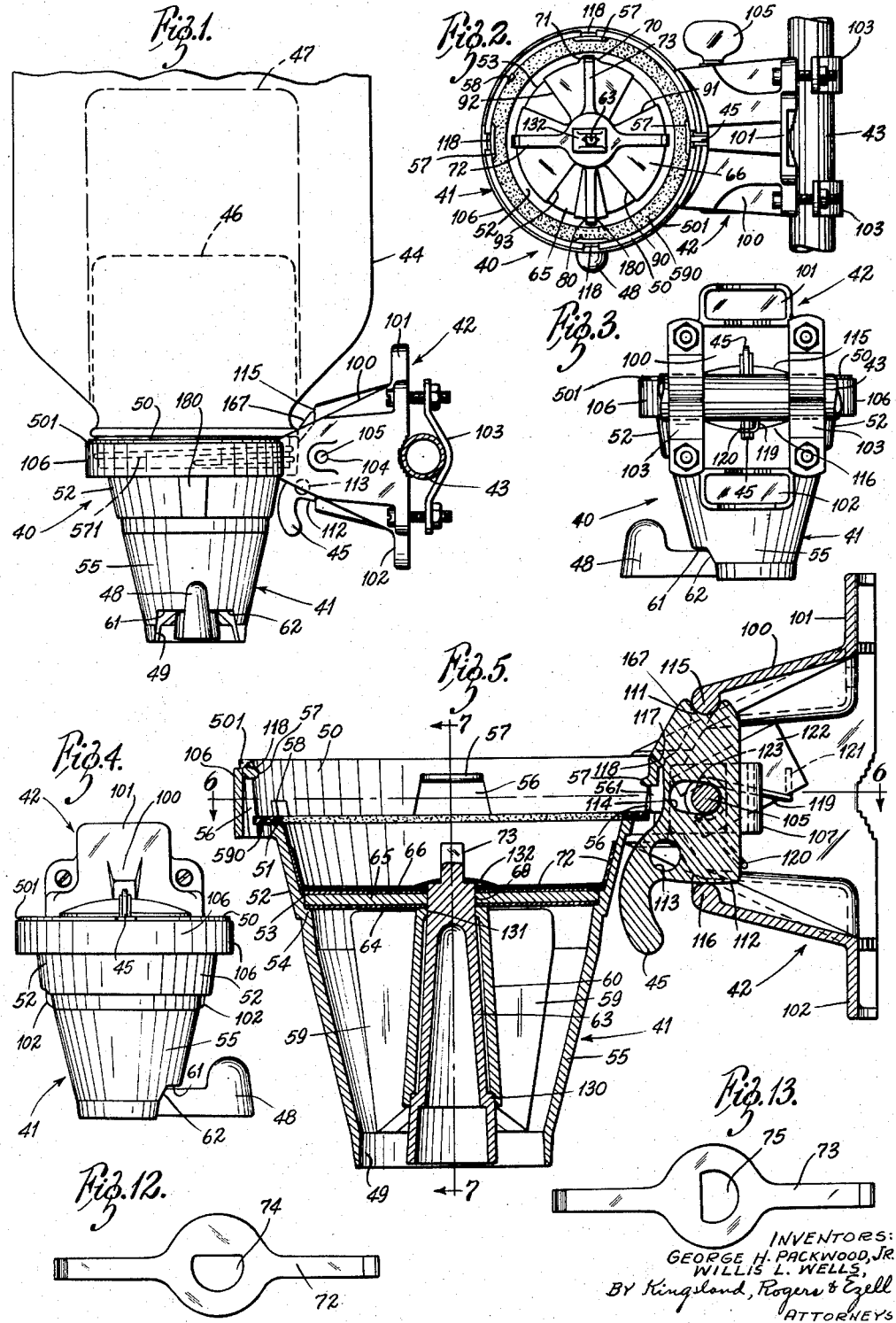

Feb. 9, 1960   G. H. PACKWOOD, JR., ET AL   2,924,358
GRANULAR SOAP DISPENSING APPARATUS
Filed Jan. 4, 1954   4 Sheets-Sheet 2
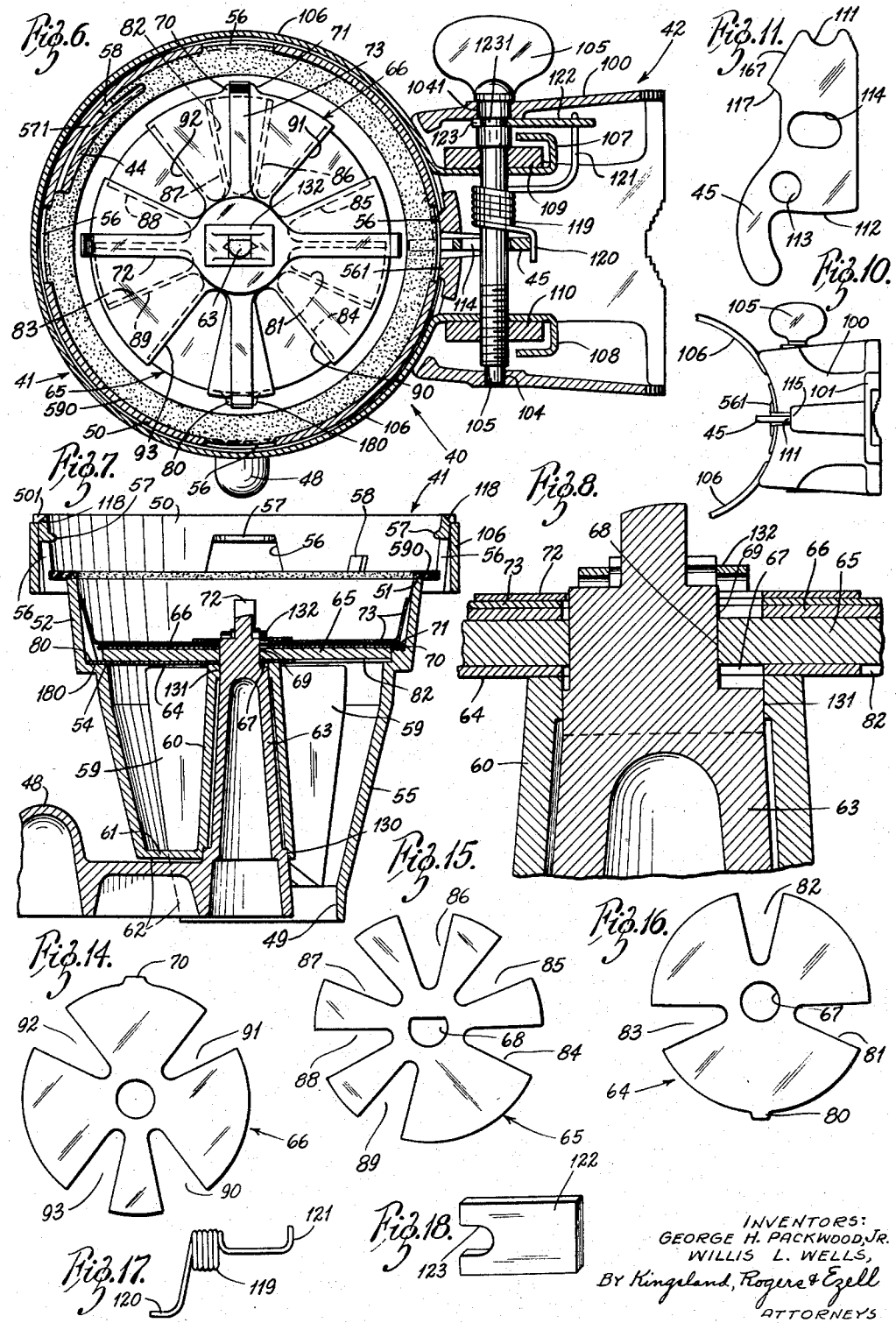
INVENTORS:
GEORGE H. PACKWOOD, JR.
WILLIS L. WELLS,
BY Kingsland, Rogers & Ezell
ATTORNEYS Feb. 9, 1960 G. H. PACKWOOD, JR., ET AL 2,924,358
GRANULAR SOAP DISPENSING APPARATUS
Filed Jan. 4, 1954 4 Sheets-Sheet 3
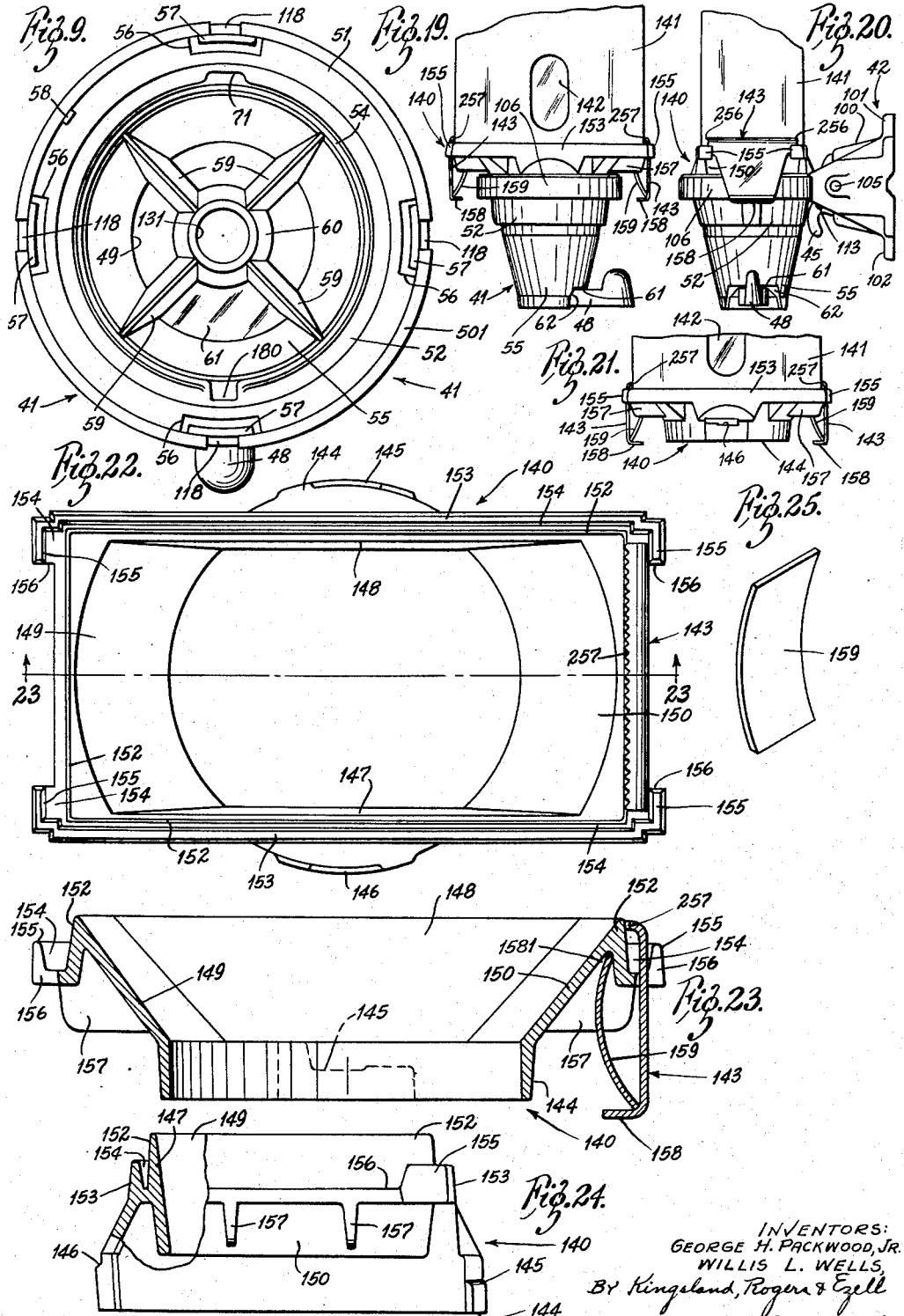
INVENTORS:
GEORGE H. PACKWOOD, JR.
WILLIS L. WELLS
BY Kingsland, Rogers & Ezell
ATTORNEYS

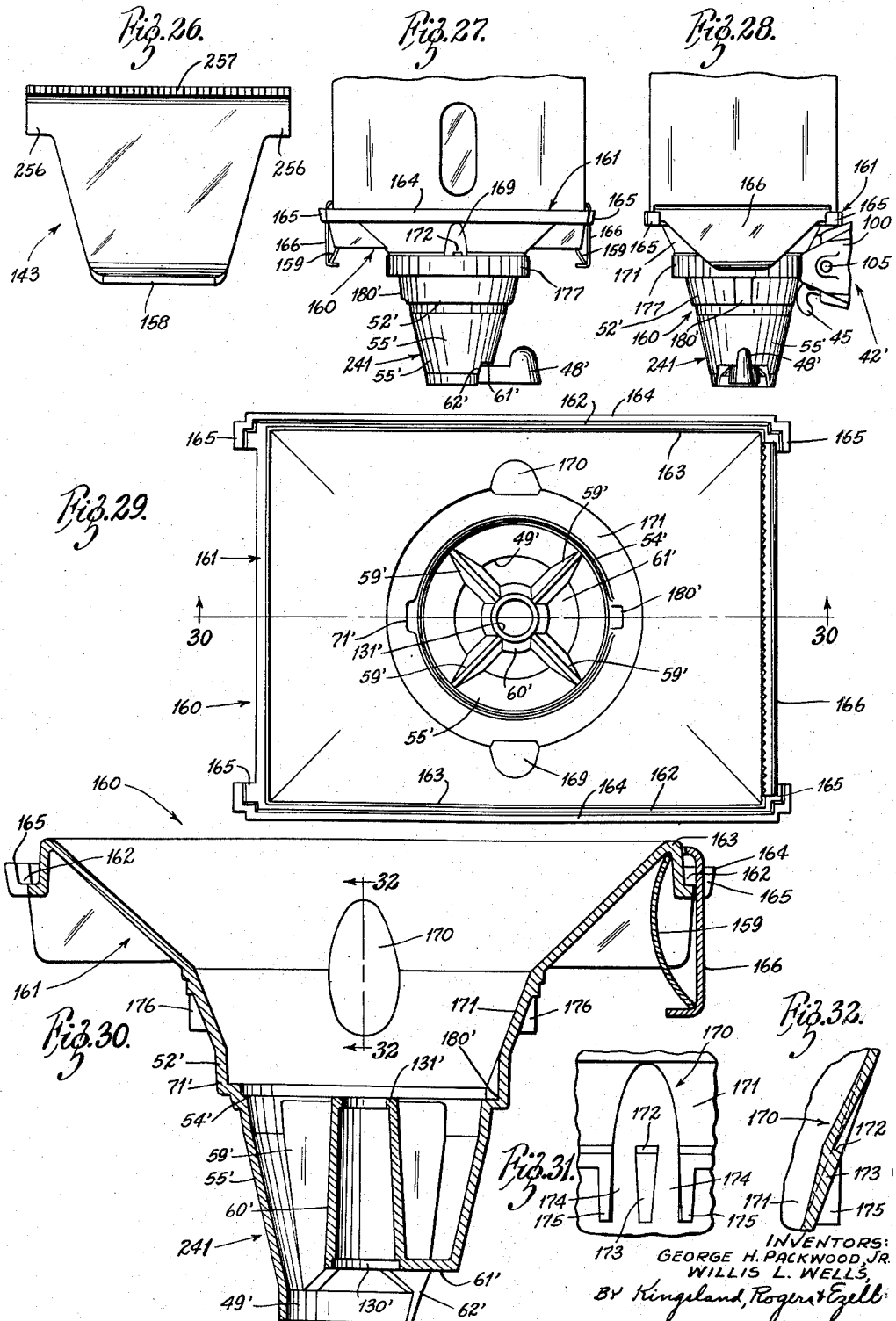

United States Patent Office 2,924,358
Patented Feb. 9, 1960

2,924,358

GRANULAR SOAP DISPENSING APPARATUS

George H. Packwood, Jr., St. Louis, and Willis L. Wells, Clayton, Mo.; said Wells assignor to said Packwood Application January 4, 1954, Serial No. 401,876

13 Claims. (Cl. 222—239)

This invention relates to improvements in dispensers, and in particular is concerned with a dispenser for a granular material in which metered quantities of the material are dispensed therefrom. The invention will be described with respect to a soap dispenser, but it is to be understood that it is of value in dispensing any powdered or granular mass.

Briefly, the invention comprehends the use of metering discs which are so provided and designed to prevent any leakage of material therethrough when the dispenser is not being operated. Thus, even though the dispenser is subjected to vibration and the like, there will be no leakage because of positive sealing of the metering mechanism, which comprises a metering disc and a top and bottom plate fitting therearound within the dispenser.

The complete dispensing unit includes a dispensing bowl having a metering mechanism therein for the discharge of the material to be dispensed, a bracket which may be fitted against a wall or a pipe, and an adapter which can fit over the bowl. This adapter is used where glass jars for storing the material are not employed, and is designed so as to receive a carton of granular soap or the like. Simple and efficient clamping means is provided where the adapter is to be used to insure proper securing of the package to the adapter at all times.

The bracket is especially designed so as to support the dispensing bowl by means of a rim-like strap which can be tightened against the bowl by a conventional thumbscrew within the bracket. A latching and locking means is provided within the bracket to prevent tampering and insure positive locking of the bowl to the bracket. This latching means comprises a mechanism which prevents removal of the bowl even though the thumbscrew has been operated and the clamp loosened.

Accordingly, it is an object of this invention to provide a dispenser for granular materials having a metering device therein which insures the discharge of a precise measured amount of the material and prevents any leakage through the mechanism when the dispenser is not operated.

It is a further object of this invention to provide a dispenser for granular material having a metering device for receiving the material to be discharged, comprising two stationary plates having openings on either side of an intermediate metering plate which may be of a varying thickness so as to provide for changing the amount of material to be dispensed in any one operation.

Yet another object of this invention is to provide a dispensing apparatus having a bowl-like dispensing and discharging element which is secured to a bracket by means of a support strap for ready removal and in which the bracket can be secured either to a wall or supporting rods, pipes and the like.

Yet another object of this invention is to provide a dispensing apparatus having a bowl-like dispensing and discharging element which is adapted to be secured to a bracket by a manually tightenable support strap, wherein a latch is provided to prevent unauthorized removal of the bowl-like element despite loosening of the strap.

A still further object of this invention is to provide a dispensing apparatus comprising a bowl-like discharging element which is designed to receive a jar of material to be dispensed directly therefrom or through an adapter. This adapter is designed to receive cartons of materials to be dispensed and has means for clamping the carton to the adapter to prevent removal or dislodgement therefrom.

A further object of this invention is to provide a dispensing apparatus comprising a bowl-like discharging element of a relatively simple and inexpensive design which may be secured to a wall bracket without any complicated mechanism by a conventional tightening screw which may be readily and efficiently operated by unskilled labor. Further, this apparatus is designed to receive a jar of material upon the bowl-like element in a simple locking engagement or to receive an adapter upon the bowl-like element, which adapter is designed to secure cartons for storing the material to be dispensed by means of a simple spring loaded clamp to prevent dislodgement thereof.

Further objects of this invention will appear from the detailed description below and will be otherwise apparent to those skilled in the art.

The invention is typified in several specific embodiments illustrated in the drawings for the purpose of description, wherein:

Figure 1 is a view in elevation showing the dispenser attached to a wall bracket on a pipe and connected to a jar of material to be dispensed;

Figure 2 is a plan view of the apparatus shown in Figure 1 with the jar omitted;

Figure 3 is a rear view in elevation of the apparatus shown in Figure 2;

Figure 4 is a front elevational view of the apparatus with the jar removed;

Figure 5 is an enlarged vertical cross section of the apparatus;

Figure 6 is a horizontal cross section taken on the line 6—6 of Figure 5;

Figure 7 is a vertical cross section taken on the line 7—7 of Figure 5;

Figure 8 is an enlarged sectional view showing the connection of the metering element to the meter handle;

Figure 9 is a plan view of the dispenser bowl with the metering mechanism removed therefrom;

Figure 10 is a plan view showing the main portion of the bracket;

Figure 11 is a plan view of the latch element or trigger used in the bracket;

Figure 12 is a plan view of one of the agitator arms adapted to be connected above the metering device;

Figure 13 is a plan view of another agitator arm;

Figure 14 is a plan view of a top plate used in the metering device;

Figure 15 is a plan view of the metering plate;

Figure 16 is a plan view of the bottom plate used in the metering device;

Figure 17 is a view of the spring used in the latching mechanism in the bracket;

Figure 18 is a view of the retainer plate forming part of the latching means in the bracket;

Figure 19 is a view in front elevation of the dispenser shown connected to an adapter and a carton secured thereto;

Figure 20 is a view in side elevation of the carton and adapter connected to the bowl dispenser and the bracket;

Figure 21 is a fragmentary view in front elevation of the adapter and clamping means securing the carton thereto;

Figure 22 is a top view of the adapter;

Figure 23 is a vertical sectional view of the adapter taken on line 23—23 of Figure 22;

Figure 24 is an end elevation of the adapter taken from the right end of Figures 22 and 23;

Figure 25 is an isometric view of the spring used in the adapter clamp;

Figure 26 is a plan view of the adapter clamp;

Figure 27 is a view in front elevation of a modified dispenser in which the bowl and the adapter are integral;

Figure 28 is a view in side elevation of the modified dispenser;

Figure 29 is a top view of the modified dispenser;

Figure 30 is a vertical cross-sectional view taken on the line 30—30 of Figure 29;

Figure 31 is an elevation of the outside of a latching ledge shown in Figure 30; and Figure 32 is a sectional view of the latching ledge of Figure 31, taken on the line 32—32 of Figure 30.

Referring now to the drawings, and Figures 1 through 8 in particular, the dispenser is shown generally indicated at 40. The dispenser includes as its main component elements shown in Figure 1 a dispenser bowl 41 fastened to a mounting bracket 42, here shown as mounted upon a pipe 43. A jar 44 containing granular material is secured to the dispenser bowl, but may be removed therefrom by operation of trigger 45 positioned within the mounting bracket, as will appear. Various size jars having the same size mouth, such as those shown in dotted lines at 46 and 47, may also be used. A dispenser handle 48 is provided, which extends within the bowl 41 for dispensing the granular material through a discharge orifice 49 in the bottom of the bowl. The particular structure of these main components and their positional relationship with respect to each other will be discussed in full below.

The dispenser bowl 41 is of a generally frusto-conical configuration and includes an upper rim-like portion 50 having an internal shoulder 51, a sloping intermediate wall section 52 having inner shoulders 53 and 54 and a lower tapering wall portion 55. The rim 50 has a flange 501 around its upper edge, which is cut away at four points with four slots 56, as best shown in Figures 5, 6 and 7. These slots are designed so that the dispenser bowl may be positioned within the mounting bracket in any one of four positions by the engagement of a positioning lug 561 on the bracket with one of said slots, as will hereinafter appear. This lug actually is two parts of a bracket portion, with characteristic shape to fit into any of the slots 56. Above each of these slots there is an inwardly projecting lug 57 for accommodating the thread 571 of the jar 44 which is held within the rim, as will appear below. The four lugs 57 are arranged in a spiral, corresponding with a standard jar thread, such as that on fruit jars, for example. A positioning lug 58 is further provided which can serve to position the jar or the adaptor to be described, within the rim. This stop lug 58 extends inwardly enough so that it can be abutted by the end of the thread 571, as shown in Figure 6, thereby limiting the twisting movement of the jar or container 44. This is valuable to insure proper alignment of the forward part of the jar with the front of the dispenser. A gasket 590 rests on shoulder 51 for proper sealing when the mouth of the jar is fitted thereagainst; and this gasket has sufficient thickness and resilience to assure sealing whenever the thread 571 abuts the stop 58.

Within the lower wall portion 55 four vanes 59 are fixed to the interior wall thereof. The vanes 59 are at right angles to one another and are connected at their inner ends with a bearing sleeve 60 which is of a generally tapering configuration. As shown in Figure 7, a bottom horizontal wall 61 is connected to the bottom of two of the vanes so as to close off one of the four sections defined by the four vanes to the flow of material therethrough. This wall is above the handle 48.

The lower wall portion 55 is cut out at 62 so as to provide for movement of the handle 48. The handle 48 is connected at right angles to a hollow tapering spindle 63 which fits within tapered bearing sleeve 60 and extends thereabove. The spindle bears within the bearing at an offset portion 130 which limits the upward movement of the spindle, and also at a surface 131 at the top of the bearing, as appears in Figures 7 and 8. The upper end of the bearing 60 is flat and co-planar with the ledge or shoulder 54. Upon it are supported the different elements of the metering device and the means by which the handle 48 and the spring 63 are held firmly within the bearing.

The metering device comprises three plates which are a bottom plate 64, an intermediate metering plate 65, and a top plate 66. These are shown in detail in Figures 16, 15 and 14, respectively. The bottom plate 64 is of appropriate diameter to fit within the recess above the shoulder 54, and to rest upon that shoulder and the top flat surface of the bearing 60. The bottom plate 64 has an indexing tab 80 on its edge which fits into a notch 180 formed in the sloping intermediate wall portion 52 of the bowl 41, to hold the plate in fixed angular relation to the bowl. The bottom plate 64 is provided with a central opening 67 through which the upper end of the spindle 63 extends.

The metering plate 65 is mounted above the bottom plate 64 within the same recess over the shoulder 54. It is shown in Figure 15 as having a central opening 68 which is non-circular, with one flat side. The upper end of the spindle 63 also has a flat surface 69 so that the plate 65 may be located thereover and rotate therewith when the handle 48 is moved.

The top plate 66, shown in Figure 14, is mounted above the metering plate 64. It is of larger diameter than the metering plate, so that it is supported on the shoulder 53 of the bowl. It is provided with a locating or indexing ear 70 which fits within a notch 71 on the interior of the wall portion 52 of the bowl, so that this plate 66 may be held against rotation in the bowl.

Fitting over the top plate 66 are two agitator elements 72 and 73 provided with characterized openings 74 and 75 which are identical to the configuration of the opening 68 for metering plate 65. Each of the agitator blades has straight arms which are upturned at the ends so as to provide for agitating the granular material and to keep it in pulverized form. It will be noted that the agitator blade 72 has its arms parallel to the straight side of the opening 74, whereas agitator blade 73 is arranged in a perpendicular fashion. This assures that when the blades are fitted over the top of the spindle they are arranged at right angles to one another, as shown in Figure 6.

The spindle 63, the metering device with its three plates, and the agitator arms are all kept in place in the dispenser bowl by a lock plate 132, such as a Tinnerman nut, which is pressed over the top end of the spindle and locks itself thereon. It can be removed by being turned until the flat on the spindle is presented to one leaf of the nut. This locking nut secures the handle and spindle in the bowl and holds the metering device parts as well as the handle parts and agitator parts together.

The metering device comprises three plates, 66 as a top plate, 65 as an intermediate or metering plate, and plate 64 as a bottom plate. These plates define the amount of material which is to be dispensed by movement of the handle 48. The plates 64 and 66 are assembled in the relationship shown in Figures 14, 15 and 16 and in Figure 6 by virtue of the indexing lugs 80 on plates 64 and 70 on plate 66, which fit in the respective notches 180 and 71 within the dispenser bowl. The metering plate 65 is keyed to the flat side of the spindle by means of the characterized hole 68, and the cut out 62 at the bottom of the bowl defines the limits of movement of the handle 48 and hence of the metering plate 65. Each one of these plates has specially designed wedge-shaped openings which are arranged about its periphery for a particular purpose, as will appear.

Bottom plate 64 is provided with openings 81, 82 and 83, making three openings in all. The metering plate 65 is provided with six openings numbered from 84 through 89, inclusive. The top plate is provided with four openings 90, 91, 92 and 93.

It can be seen, therefore, that when these three plates are assembled one over the other, as shown in Figures 6 and 7, with the top and bottom plates oriented by their lugs 80 and 70, none of the openings 90 through 93, inclusive, of the top plate 66 is in register with any of the three openings 81, 82 and 83 of the bottom plate 64. Since the top and bottom plates are fixed within the bowl and can not be rotated, and since the metering plate 65 between the top and bottom plates can not be rotated, no leakage due to vibration or the like is possible through the metering device.

The metering action is effected by the rotation of the plate 65 through an angle corresponding to the arcuate opening 62 at the bottom of the dispenser through which the handle 48 is moved.

When the plates 66 and 65 are superimposed upon plate 64 in the same relative positions as shown in Figures 14 through 16, that is without rotation, the following openings will be in register. (In this position of the plates, the handle 48 is as far counterclockwise in Figures 2 and 6 as the cut out 62 permits.) Starting from the bottom of the plate and proceeding clockwise, opening 93 in top plate 66 will be in register with opening 89 in the metering plate 65. Opening 88 of the metering plate will be in register with opening 83 of the bottom plate. Opening 92 of the top plate will be in register with opening 87 of the metering plate. Opening 86 of the metering plate will be in register with opening 82 of the bottom plate. Opening 91 of the top plate will be in register with opening 85 of the metering plate. Opening 84 of the metering plate will be in register with opening 81 of the bottom plate.

The metering plate is movable by the operation of the handle so as to be rotated in a clockwise position looking down on Figure 6. In this manner, material received through the openings of the top plate when the metering openings are in register therewith can be discharged by moving the metering plate clockwise to the limiting position of the handle wherein the meter plate openings originally in register with the openings in the top plate now are in register with the bottom plate openings and the material carried by the metering plate falls therethrough. The same procedure is effected when the meter plate is returned from its newly assumed clockwise position to the first position shown in Figure 6 such that an alternate fill and discharge takes place in each operation.

Thus, when the metering plate is moved, as mentioned above, to the extreme clockwise position, it will be seen that the following openings in the various plates are in register with one another. Opening 89 of the metering plate is in register with opening 83 of the bottom plate. Opening 92 of the top plate is in register with opening 88 of the metering plate. Opening 87 of the metering plate is in register with opening 82 of the bottom plate. Opening 91 of the top plate is in register with opening 86 of the metering plate. Opening 85 in the metering plate is in register with opening 81 of the bottom plate. Opening 90 of the top plate is in register with opening 84 of the metering plate.

It will be noted that the openings in the fixed top plate and the bottom fixed plate are staggered with respect to one another, and if these plates were superimposed, one upon the other, there would be shown to be seven equally spaced wedge-shaped openings. Adjacent openings in this superimposed relationship are in every case separated by a distance equal at least to that of the wedge-shaped opening. Actually, the spacing, as shown in Figure 6, is such that the solid, or land, areas between adjacent openings is greater than the angular width of the openings, to insure against bleeding of the dispenser. Therefore, since the metering plate must be movable to transfer material from the corresponding registered top opening to the corresponding next adjacent registered bottom opening, the movement must be at least the distance of twice the angular width of the wedge-shaped metering plate opening or about 52° of rotation in the illustrated design. It is important that pie (arcuate) shaped openings are less than one-half of the 52°. Otherwise, with a little vibration, soap could pass through the metering device. Note the overlap indicated in Figure 6 wherein the metering plate is in a mid-position of its travel. There the lands of the metering plate overlap the lands of the top and bottom plates, and insure inability to bleed the dispenser. The top plate openings are more than closed before the bottom plate openings are opened.

In determining the size and number of the openings in the metering device, it first is noted that each top plate opening, such as 91, supplies two adjacent metering plate openings 85 and 86, respectively, when the metering plate 65 is oscillated to its opposite extremes. Also, each bottom plate opening such as 82 discharges from two adjacent metering plate openings 86 and 87. The unit to be considered is the distance between the middle of adjacent top (or bottom) plate openings. This distance also equals that between every second metering plate opening.

The unit consists of the width of two openings plus two spaces or lands. To avoid all bleeding of the valve, the lands should be slightly wider than the spaces, as illustrated in Figure 6. Consequently, a unit of space is divided into two lands totalling slightly over half the width of the unit, and two spaces totalling slightly under half the width of the unit. An opening is therefore a little less than, and a land is a little more than, one-fourth of a unit.

The number of units depends upon the space available and the extreme sizes of openings. In the present dispenser, the angular space available is about 270°, because of the wall 61 above the handle over which no discharge should occur. No discharge opening is in the bottom plate 64 between the vanes 59 flanking the wall 61. Also, desirably, no discharge opening should be directly above the upper edge of a vane 59. The arrangement illustrated provides a discharge opening 81–83 in each of the three available quadrants between the vanes 59. Each discharge opening discharges material from two adjacent metering plate openings that, respectively, are charged from two adjacent top plate openings.

The bracket assembly 42 which is used for clamping the dispenser bowl 41 to a pipe 43 or the like comprises a casing 100 which is of a special configuration, as will be described. The casing has upper and lower flanges 101 and 102, respectively, provided with holes to receive nuts and bolts for attachment to a wall or clamping holding straps 103 thereto. It is to be understood that the casing could be fastened to a flat surface by the use of screws or the like, in which case the straps 103 would be dispensed with.

Extending through the casing and journaled at both ends as indicated by 104 and 1041 is a thumbscrew 105 which is used for adjusting a holding ring or rim-like support strap 106 that fits around the upper wall of the dispenser bowl. This ring has ends 107 and 108 bent outwardly over and inwardly as illustrated, and which are provided also with holes through which the thumbscrew 105 can fit. Two nuts 109 and 110, the former being backed by a shoulder on the thumbscrew and the latter being threaded, also fit over the thumbscrew to provide for the tightening or loosening of the ends 107 and 108 of the strap 106 toward each other or away from each other, depending upon the manner in which the thumbscrew 105 is turned. These square nuts are prevented from being rotated by engagement of their edges with elements 107 and 108.

The trigger or latching assembly includes the trigger plate 45 which is of a shape shown in Figure 11. This trigger includes a concave upper bearing surface 111 and a concentric arcuate convex lower bearing surface 12. It is also provided with an opening 113 to receive a locking pin or the like, as will appear, and an arcuate slot 114. Adjacent to the bearing surface 111 are two angled edges 167 and 117, for a purpose to appear.

The trigger plate 45 fits within the bracket, as shown in Figure 5, where it is seen that the upper bearing surface 111 engages rockably onto the beaded edge 115 of the casing 100, and the lower bearing surface 112 bears rockably against the lower beaded surface 116. The shank of the thumbscrew 105 fits through the slot 114 and the locking opening 113 is positioned outside the assembly so that a lock such as a padlock may be fitted therethrough to prevent the trigger from being rocked backwardly from the dispenser bowl 41. Reference to Figure 5 shows that the pin or shank of a lock passed through the hole 113 will abut the adjacent parts of the casing 100.

Upon inspection, it will be noted that the trigger plate has an overhanging latching edge 117 which is more or less concentric with the center of curvature of the arcuate bearing surface 11. This latching edge 117, as shown in Figure 5, overlies a beveled edge 118 of the upper portion of the wall of the dispenser bowl. Thus, the trigger 45 in the position shown in Figure 5 is in the locked position and the bowl cannot be removed from the bracket, even though the clamp strap is loose around the dispensing bowl. Removal is prevented because the clamp strap can be expanded only until the end 108 abuts against the journal 104 of the bracket which does not give enough clearance for the removal of the bowl until the latch is retracted. The retraction of the latch unlocks the edge 117 from the bowl and then provides sufficient clearance.

The trigger is supported in bowl locking position within the bracket by a spring loaded biasing device which includes the spring 119, shown in Figure 17. This spring has specially formed ends 120 and 121 which contact the back edge of the trigger 45 and a retainer plate 122, respectively. The retainer plate 122 is shown in Figure 18 and has a notch 123 by which it is adapted to fit onto a groove 1231 in the shank of the thumbscrew. By this means, it serves to hold the thumbscrew in the bracket and serves as a thrust bearing so that the thumbscrew can tighten the strap. Also, the retainer plate 122 anchors one end of the torsion spring 119, by which spring the trigger 45 is urged about the bead 155 in a clockwise direction into locking position over the edge 118. This normal position is illustrated in Figure 5.

A carton adapter for use with the dispenser bowl is shown in Figures 19 through 24, and a clamping assembly for use therewith is shown in Figures 25 and 26. The adapter, generally indicated at 140, is shown connected to the dispenser bowl in Figures 19 and 20 and holding a carton 141. This carton may be provided with a transparent window 142 so that the amount of material therein may be seen in order that the carton can be replaced when replenishment is required.

The adapter 140 is more fully shown in Figures 22, 23 and 24 as including a rim-like base flange 144 which is adapted to fit within the upper wall 50 of the dispenser bowl. The base flange 144 has lugs 145 and 146 on its outer surface, which lugs are arranged in spiral form so as to enable the adapter to be attached into the upper flange 50 of the bowl the same way the previously mentioned jar 44 is attached; i.e., by inserting the adapter into the bowl and twisting until the lugs 145 and 146 are locked under lugs 57 of the bowl 41.

Above the rim-like member 144, the rectangular carton adapter structure includes inner, almost vertical front and rear walls 147 and 148, and arcuate, downwardly converging end walls 149 and 150. These walls are conformed into a rectangular top, as shown in Figure 22. The side wall 152 of this rectangular top slopes downwardly and slightly outwardly all around the adapter.

On the front and rear of the structure, there is an upstanding wall 153 spaced outwardly from the wall 152 to form a channel 154. The wall 153 is stepped outwardly at 155 adjacent the corners, and then is cut away to provide an open space 156, for a purpose to appear, at each end. There are two flanges or webs 157 at each end of the adapter that extend outwardly from the outside of the walls 149 and 150.

The groove 154 extending around the adapter is designed to receive the open edge of an inverted carton. The carton fits onto the inner wall 152 and is confined by the spaced wall 153. The outer side of the end of the carton is partially exposed through the spaces 156 at the ends of the adapter.

These ends of the adapter are adapted to receive carton clamps 143 that appear in elevation in Figures 20 and 26, in top plan in Figure 22, and in vertical section in Figure 23. Each carton clamp is of wing shape, with lateral upper extensions 256 that are insertable behind the corner extensions 155, into the groove 154, and rockably retained there. The upper end edge is turned back toward the horizontal and is serrated at 257 to provide for secure gripping of the sides of the carton. The body of each clamp 143 projects through the opening 156 and extends downwardly, tapering inwardly to an inturned bottom edge 158. Each clamp is held in place by a leaf spring 159 which bears against the lower end 158 of the clamp and is interfitted in the wedge-shaped opening 1581 formed between the wall 150 and the edge element 152. The ribs 157 confine the spring 159 in position laterally. The spring 159 resiliently and firmly urges the serrations 257 toward the carton. The pressure may be relieved by pressing inwardly on the lower part of the clamp.

A further modification of the bowl dispenser and adapter is shown in Figures 27 through 30 inclusive, wherein an integral dispenser bowl and adapter structure is illustrated. The integral adapter, which hereinafter shall be called the carton dispenser, for purpose of identification, is shown generally at 160. The carton dispenser is of integral construction and includes at its lower end a dispenser bowl 241 which is assembled similarly to the bowl dispenser 41 in all respects, with the exception that the means for securing the jar or adapter at the top of the bowl has been eliminated since the carton receiving means is integrally formed therewith. The carton receiving structure indicated generally at 161 is similar to the structure of the carton adapter in that it includes a channel 162 defined by a raised inner edge 163 and a raised outer edge 164, the latter extending around the corners and being offset, to provide ends 165 that receive clamps 166 in the same manner as previously described for the carton adapter. The clamps 166 are acted on by leaf springs 159, as before. It will be noted, however, that in this modification the carton receiving structure is wider than the carton adapter shown in Figure 22 as will be seen in comparing Figure 29 so that a larger carton may be received on the dispenser. Obviously, variations in size and configuration of the carton receiving structure are possible in both the carton dispenser and carton adapter depending on the desires of the manufacturer. For purposes of identification, the elements in the dispenser bowl are identical with the dispenser bowl 41, shown in Figure 1, and are given like reference numerals, with primes.

In order to provide latching ledges for the latch and characterized interfitting devices to assure alignment of the dispenser and the bracket, the upper walls of the dispenser are provided with latching ledge arrangements at the front and in the rear, as generally indicated at 169 and 170. The arrangement 170 is illustrated in Figures 31 and 32.

At this point, the portion 171 of the combination dispenser base and adapter converges inwardly and downwardly. Figure 32 shows how this wall is offset inwardly to provide a latching ledge 172 that is the top edge of an outwardly projecting spur 173. The spur 173 is flanked by two spaces 174, and they in turn are flanked by two flanges 175. These latter flanges 175 have their outer edges vertical, and with similar flanges 176 they provide supports for the clamping band 177 corresponding to the band 106 of the first embodiment.

The undercut portions 169 and 170 further serve as positioning devices to insure correct placement of the assembly within the bracket in either of the two available positions. The two spaces 174 that flank the spur 173 are adapted to receive the lugs of the bracket 42' that correspond to the lugs 561 of the first modification.

Use of the apparatus

The installation of the dispenser of Figures 1 through 18 requires first a mounting of the support bracket 42 upon a pipe, wall or the like. Mounting it upon a pipe is effected in an obvious manner by bolting the casing 42 and the straps 103 around the pipe 43, as will be understood. Also, screws or the like can be passed through the corner holes in the casing 100 into a wall or the like.

The bowl assembly is inverted and installed onto the top of a jar or similar container of material, such as granulated soap, to be dispensed. In the embodiment of Figures 1 through 18, the bowl assembly is screwed onto the jar, by interengaging the thread 571 of the jar with the four lugs 57 and twisting until the leading end of the thread engages the stop 58. This stop is located so that the attachment of the jar to the bowl assembly is tight when the thread and stop engage.

The valve in this dispenser is never open through the orifice, and the assembly of bowl and container may be forthwith reverted. Meanwhile, the trigger 45 is unlocked and the thumbscrew 105 is loosened. This last loosens the strap 106. Thereafter, the bowl and jar assembly is inserted from the top down into the loosened clamp 106. The bowl will slide along the edge 167 of the latch 45, rocking it back against the torsion spring 119, until the bowl assembly is in place within the clamp 106 and can descend no more because the rim 501 seats on the top edge of the clamp. In order to fit within the clamp 106, the bowl assembly must have been oriented about the vertical axis so that one of the four slots 56 engages onto the lugs 561 of the supporting bracket. This assures that any contour design or inscriptions on the jar will face properly, whichever way the dispenser faces with respect to the mounting bracket. When the bowl assembly is thus seated onto the flange or rim 501, with the lugs 561 in a slot 56, the latching edge 117 will overlie the bevelled surface 118 on the rim 56, preventing removal of the bowl assembly from the clamp 106. Thereafter, the thumbscrew 105 is tightened to draw the ends 107 and 108 of the rim-like clamp 106 together about the upper wall 50 of the bowl and hold it firmly in place.

It will be noted that the bowl cannot be removed by merely loosening the thumbscrew 105 since the trigger 45 prevents the upward movement of the bowl by virtue of the inner action of its edge 117 against the bevelled edge 118 of the dispenser bowl wall, even when the screw 105 is as loose as it can be without removal of the retainer 122. This prevents tampering since the trigger can be locked in place by insertion of a padlock within the hole 113 to prevent its actuation.

The gasket provided at 59 insures a tight seal of the bowl and the jar so that vibration, which may be transferred from the object upon which the mounting bracket is secured, will not loosen the connection.

After the unit is assembled, the dispensing operation is effected merely by operating handle 48 back and forth within its limitations of travel. Reverting the bowl causes the material from the container to descend onto the valve discs and the agitator arms 72 and 73. With the handle 48 and the metering disc 65 in an extreme position, material fills the ones of the wedge-like openings 84—89 in the intermediate or meter plate 65 that are below the wedge-like openings 90—93 within the top plate 66.

To dispense material, the meter plate is moved by operation of the handle 48 to its other extreme. This moves the previously filled wedge-shaped openings out of register with the openings 90—93 in the top plate and into register with the wedge-shaped openings 81—83 of the bottom plate 64, and the material falls down through the long, tapering part 55 and thence out the discharge orifice 49 in the bottom of the bowl, into the hand of the user.

As is evident, movement of the handle 48 and the metering plate 65 to the foregoing discharge position introduces a different set of openings 84—89 to the top plate openings 90—93, and they will discharge when the handle is moved back to its starting position.

No leakage can take place between the wedge-shaped openings of the top plate and the bottom plate since they are always closed with respect to one another, and the wedge-shaped openings in the meter plate never establish a free opening therethrough. This is effected because of the spacing and size of the openings of the respective plates such that no opening in the meter plate is ever in partial register with openings both in the top and bottom plate at the same time.

During the operation of the handle 48, the agitator blades 72 and 73 are also operated since they are keyed upon the top portion of the spindle 63 in the same manner that the meter plate is secured. The operation of the agitator blades insures a pulverant and comminuted form of the material to be dispensed so that no clogging or obstruction can take place.

In using the dispenser, and bringing a hand which which may be wet toward and perhaps against the bottom of the dispenser, water may be splashed into the orifice 49. This is prevented from reaching the metering plates by the relatively long pasages formed by the conical wall 55, the vanes 59 and the center part 60. These passages are all amply large in cross section to insure free flow of material dispensed, but are also long enough to prevent water from reaching the plates.

The valving mechanism, consisting of the handle 48, the metering plates and (preferably) the agitator arms, is removable by a quater turn on the speed nut 132, followed by dropping of the handle and lifting out of the plates. This affords easy servicing. Also, the quantity metered is regulatable by changing the metering plate 65 to one of different thickness or with smaller openings.

Where it is desired to use a cardboard container, the adapter, as shown and previously described in Figures 19 through 24, may be utilized. Thus, the adapter shown generally at 140 may be secured to the bowl dispenser 41 in the same manner as previously described for the jar 44. Preferably, the cardboard container is first secured to the adapter by removing the top of the carton and placing the adapter thereon in inverted form. The end edges of the open top of the cardboard carton fit within the groove 154 around the outer periphery of the rectangular upper edge of the adapter, as will be evident in Figures 22 and 23. In order to permit application of the carton to the bowl assembly, the lower ends of the clamps 143 are pressed inwardly toward the bowl, making the space accessible for the end edges of the container. After the container is in place the clamps 143 are released, and the serrations 157 dig themselves into the carton and hold it in place, under force of the leaf springs 159. The lugs 145 and 146 of the adapter will be engaged by the mating lugs 57 on the upper wall 50 of the dispenser bowl by an insertion and twisting similar to a bayonet jointing.

The modification shown in Figures 27 through 30 can be used similarly to the adapter assembly. In these drawings, the bowl and adapter 160 are integral. This assembly is first of all inverted to receive a cardboard container 141 within the adapter section 161. The end edges of the carton are secured within the grooves 162 and held in place by the clamps 166, as described above.

Thereafter, the integral assembly 160 is secured to the mounting bracket 42 by being inserted into the rim-like clamp 177 about the lugs 176 of the dispenser bowl, as shown in Figures 27 and 28. This is effected after the assembly 160 is pushed down inside the loosened clamp strap, which action automatically retracts latch 45 by a camming action effected on the sloping surface 167. This camming action continues until the ledge 172 moves below the latching edge 117 of the trigger, whereupon spring action of the spring 119 causes the trigger to move over the top of the ledge 172 provided in the undercut portion 169 or 170.

If it is desired to have the handle 48″ operate from the right, as shown in Figures 27 and 28, the undercut portion 170 engages the trigger. Otherwise, where it is desired to have the handle operate from the left, the reverse positioning, with the undercut portion 169 to the rear, is effected by turning the dispenser around. The operation of the metering device, after the mounting to the bracket has been accomplished, is the same as in the other embodiments of this invention.

It will be apparent that various modifications and changes may be made within the teachings of this invention, as will be obvious to those skilled in the art. Such modifications and changes falling within the teachings of this invention are within the scope of this invention as defined by the claims appended hereto.

What is claimed is:

1. In an apparatus for dispensing discrete material from a reservoir, stationary material receiving means in full communication with said reservoir, dispensing means selectively movable to receive said material from said material receiving means, stationary discharge means communicating with a material outlet for discharge of material therethrough, said dispensing means being further selectively adapted to block said receiving means to the flow of material therethrough while receiving a plurality of metered charges and simultaneously communicate a previously metered plurality of separate charges with said discharge means, said dispensing means having operating means for effecting movement thereof, and agitator means extending within said reservoir for keeping said material in discrete form, said agitator means including a plurality of blades closely overlying said material receiving means and having terminal portions extending vertically along the inside of said reservoir, said blades being movable to wipe material from the surfaces of said reservoir and material receiving means, said receiving means, dispensing means and discharge means all being provided with openings for the passage of said material therethrough, said openings in the dispensing means being arranged so that for one position of said dispensing means sealing of the openings is effected.

2. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a stationary first member having a plurality of openings therein, said dispensing means including a movable second member having a plurality of openings therein which are adapted to be selectively moved into and out of communication with the openings in said first member, said discharge means including a stationary third member having a plurality of openings therein arranged so that when the openings in said first and second members are in communication with one another the openings in said third member are blocked from the opening in said second member, said openings in the dispensing means being arranged so that for one position of said dispensing means sealing of the openings is effected.

3. In an apparatus for dispensing discrete material from a reservoir, material receiving means in full communication with said reservoir, dispensing means selectively adapted to receive said material from said material receiving means, discharge means communicating with a material outlet for discharge of material therethrough, said dispensing means being further selectively adapted to block said receiving means to the flow of material therethrough and simultaneously communicate with said discharge means, said receiving means including a stationary first member having at least one opening therein, said dispensing means including a movable second member having at least one opening therein which is adapted to be selectively moved into and out of communication with the opening in said first member, said discharge means including a stationary third member having at least one opening therein arranged so that when the openings in said first and second members are in communication with one another the opening in said third member is blocked from the opening in said second member, said dispensing means having operating means for effecting movement thereof, and agitator means extending within said reservoir for keeping said material in discrete form, said agitator means being movable by the operating means for relative movement with respect to the aforesaid first member of the receiving means.

4. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a first member having a plurality of openings therethrough, said dispensing means including a second member having a plurality of openings therethrough, said openings in the second member being of a similar shape to and greater in number than the openings in the first member, said second member having a selected position in which at least one of its openings is in communication with at least one of the openings in said first member and the rest of the openings in said second member are out of communication with the openings in the first member, and said discharge means including a third member having at least one opening therein arranged so that it is never in direct communication with any of the openings in said first member.

5. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a first member having a plurality of openings therethrough, said dispensing means including a second member having a plurality of openings therethrough, said openings in the second member being of a similar shape to and greater in number than the openings in the first member, said second member being movable from a first position in which at least one of its openings is in communication with at least one of the openings in said first member and the rest of the openings in said second member are out of communication with the openings in the first member to a second position in which the openings in the second member that were in communication with the openings in the first member are blocked therefrom, and the openings in said second member that were out of communication with the openings in the first member in the first position now being in communication therewith, and said discharge means including a third member having at least one opening therein arranged so that it is never in communication with any of the openings in said first member.

6. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a first member having a plurality of openings therethrough, said dispensing means including a second member having a plurality of openings therethrough, said openings in the second member being of a similar shape to and greater in number than the openings in the first member, said second member being movable from a first position in which at least one of its openings is in communication with at least one of the openings in said first member and the rest of the openings in said second member are out of communication with the openings in the first member to a second position in which the openings in the second member that were in communication with the openings in the first member are blocked therefrom, and the openings in said second member that were out of communication with the openings in the first member in the first position now being in communication therewith, the openings in said second member being arranged so that for a third position of said member situated intermediate or either side of said first and second positions there is no communication with the opening in said first member.

7. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a first member having a plurality of openings therethrough, said dispensing means including a second member having a plurality of openings therethrough, said openings in the second member being of a similar shape to and greater in number than the openings in the first member, said second member being movable from a first position in which at least one of its openings is in communication with at least one of the openings in said first member and the rest of the openings in said second member are out of communication with the openings in the first member to a second position in which the openings in the second member that were in communication with the openings in the first member are blocked therefrom, and the openings in said second member that were out of communication with the openings in the first member in the first position now being in communication therewith, the openings in said second member being arranged so that for a third position of said member situated intermediate or either side of said first and second positions there is no communication with the opening in said first member, and said discharge means including a third member having at least one opening therein arranged so that it is never in communication with any of the openings in said first member.

8. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a first member having a plurality of openings therethrough, said dispensing means including a second member having a plurality of openings therethrough, said openings in the second member being of a similar shape to and greater in number than the openings in the first member, said second member being movable from a first position in which at least one of its openings is in communication with at least one of the openings in said first member and the rest of the openings in said second member are out of communication with the openings in the first member to a second position in which the openings in the second member that were in communication with the openings in the first member are blocked therefrom, and the openings in said second member that were out of communication with the openings in the first member in the first position now being in communication therewith, the openings in said second member being arranged so that for a third position of said member situated intermediate or either side of said first and second positions there is no communication with the opening in said first member, and said discharge means including a third member having at least one opening therein which is in communication with an opening in said second member when said second member is in third position.

9. In an apparatus for dispensing discrete material from a reservoir, material receiving means in full communication with said reservoir, dispensing means selectively adapted to receive said material from said material receiving means, and discharge means communicating with a material outlet for discharge of material therethrough, said dispensing means being further selectively adapted to block said receiving means to the flow of material therethrough and simultaneously communicate with said discharge means, said receiving means including a first member having a plurality of openings therethrough, said dispensing means including a second member having a plurality of openings therethrough, said openings in the second member being of a similar shape to and greater in number than the openings in the first member, said second member being movable from a first position in which at least one of its openings is in communication with at least one of the openings in said first member and the rest of the openings in said second member are out of communication with the openings in the first member to a second position in which the openings in the second member that were in communication with the openings in the first member are blocked therefrom, and the openings in said second member that were out of communication with the openings in the first member in the first position now being in communication therewith, the openings in said second member being arranged so that for a third position of said member situated intermediate or either side of said first and second positions there is no communication with the opening in said first member, and said discharge means including a third member having at least one opening therein which is in communication with an opening in said second member when said second member is in third position, and said openings in the third member being out of communication with the openings in said second member when in the first and second positions.

10. In an apparatus for dispensing discrete material from a reservoir, material receiving means in full communication with said reservoir, dispensing means selectively adapted to receive said material from said material receiving means, discharge means communicating with a material outlet for discharge of material therethrough, said dispensing means being further selectively adapted to block said receiving means to the flow of material therethrough and simultaneously communicate with said discharge means, said receiving means including a stationary first member having a plurality of openings therethrough, said dispensing means including a second member having a plurality of openings therethrough, said second member being movable from a first position in which at least one of its openings is in communication with at least one of the openings in said first member and the rest of the openings in said second member are out of communication with the openings in the first member to a second position in which the openings in the second member that were in communication with the openings in the first member are blocked therefrom, and the openings in said second member that were out of communication with the openings in the first member in the first position now being in communication therewith, the openings in said second member being arranged so that for a third position of said member situated intermediate or either side of said first and second positions there is no communication with the opening in said first member, and said discharge means including a stationary third member having at least one opening therein which is in communication with an opening in said second member when said second member is in third position, and said openings in the third member being out of communication with the openings in said second member when in the first and second positions, said dispensing means having operating means for effecting movement thereof, and agitator means extending within said reservoir for keeping said material in discrete form, said agitator means being movable by the operating means for relative movement with respect to the aforesaid first member of the receiving means.

11. Apparatus for dispensing material and having dispensing means therein, said apparatus having receiving means for receiving one end of an open-ended carton with said end being in communication with said dispensing means, said receiving means including a plurality of wall means narrowly spaced at their upper ends and forming open-topped grooves having a width at the top only slightly greater than the thickness of the carton wall within the periphery of said receiving means for snugly and removably receiving the bottom edges of the side walls of said carton therein, clamping means for clamping the inside of said carton side wall edges against at least one of said side walls, and releasable biasing means for maintaining said clamping action.

12. Apparatus for dispensing material and having dispensing means therein, said apparatus having receiving means for receiving one end of an open-ended carton with said end being in communication with said dispensing means, said receiving means including a plurality of wall means narrowly spaced at their upper ends and forming open-topped grooves having a width at the top only slightly greater than the thickness of the carton wall within the periphery of said receiving means for snugly and removably receiving the bottom edges of the side walls of said carton therein, clamping means for clamping said carton edges against at least one of said side walls, and releasable biasing means in contact with both the wall against which the clamping action is maintained and the clamping means.

13. Apparatus for dispensing material, comprising receiving means and means to dispense material therefrom, the receiving means having an open top and being adapted to receive the open end of an inverted material container having a bottom and side walls, the side walls defining the open end; the receiving means having means to receive the side walls and engage them to prevent their being collapsed inwardly or outwardly, which means comprises inner and outer container wall-engaging means secured to and projecting upwardly from the receiving means, and spaced apart slightly further than the thickness of the container walls so that the container may have its side walls adjacent the open end inserted between the spaced wall-engaging means, and in lateral engagement therewith sufficiently to prevent lateral collapse of the container walls, and so that contents of the container may flow through the open end thereof into the receiving means, by way of the open top of the receivnig means.

References Cited in the file of this patent

UNITED STATES PATENTS

| | | |
|---|---|---|
| 1,077,027 | Austin | Oct. 28, 1913 |
| 1,617,922 | Morrison | Feb. 15, 1927 |
| 1,940,138 | McAdam | Dec. 19, 1933 |
| 2,103,063 | Clark | Dec. 21, 1937 |
| 2,182,709 | Sissom | Dec. 5, 1939 |
| 2,211,452 | Bowman | Aug. 13, 1940 |
| 2,291,984 | Ponselle | Aug. 4, 1942 |
| 2,310,848 | Glann | Feb. 9, 1943 |
| 2,385,677 | Bailey | Sept. 25, 1945 |
| 2,547,868 | Judson | Apr. 3, 1951 |
| 2,596,283 | O'Neill | May 13, 1952 |